United States Patent Office 3,484,457
Patented Dec. 16, 1969

3,484,457
CERTAIN SPIRO BUTYROLACTONES
Joseph Martin Mushowski, La Salle, Quebec, and Donald E. Horning, Candiac, Quebec, Canada, assignors, by mesne assignments, to Bristol-Myers Company, New York, N.Y., a corporation of Delaware
No Drawing. Filed Mar. 15, 1968, Ser. No. 713,286
Int. Cl. C07c *5/06;* A61k *27/00*
U.S. Cl. 260—343.6      8 Claims

ABSTRACT OF THE DISCLOSURE

Compounds of the formula

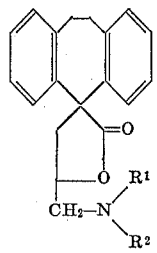

where $R^1$ and $R^2$ are each hydrogen or (lower)alkyl and the pharmaceutically acceptable nontoxic salts thereof exhibit anti-depressant activity and are useful as anti-depressant agents in mammals.

BACKGROUND OF THE INVENTION

Field of the invention

This invention relates to novel chemical compounds. More particularly, this invention relates to novel chemical compounds which possess valuable therapeutic utility as antidepressant agents in mammals. In another aspect this invention relates to a method of preparing the novel compounds.

Description of the prior art

There exists a need to provide additional agents useful as antidepressants. Thus it is an object of this invention to provide a new class of compounds having antidepressant activity.

SUMMARY OF THE INVENTION

The above and other objects which may appear as the specification proceeds are achieved by this invention which comprises the provision of compounds selected from the group consisting of compounds having the formula

I

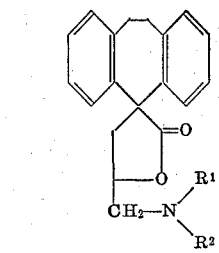

wherein $R^1$ and $R^2$ are each hydrogen or (lower)alkyl; and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like. Such salts are prepared by conventional methods.

The term "(lower)alkyl" as used herein means both straight and branched chain alkyl radicals containing from 1 to 8 carbon atoms, e.g., methyl, ethyl, propyl, isopropyl, butyl, isobutyl, t-butyl, amyl, hexyl, 2-ethylhexyl, etc.

A preferred embodiment of the present invention consists of compounds of the formula

II

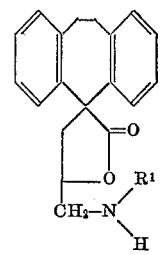

wherein $R^1$ is (lower)alkyl and the pharmaceutically acceptable nontoxic salts thereof.

Specific preferred compounds of the present invention have the formulae

III      IV

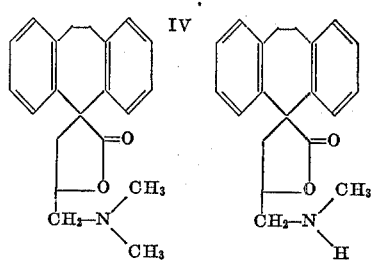

and

V

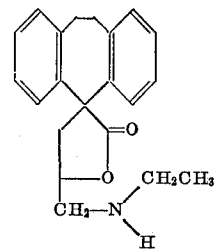

and the pharmaceutically acceptable nontoxic salts thereof.

The compounds of this invention are prepared as exemplified below by reacting a compound of the formula

VI

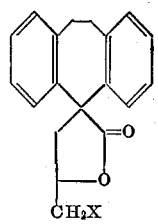

where X is chloro, bromo or iodo but preferably bromo with an amine of the formula VII           

where $R^1$ and $R^2$ are as described above in a nonreactive solvent, such as dimethylsulfoxide, dimethylformamide, benzene, ethanol and the like. The reaction is conveniently carried out at elevated temperatures, e.g., 40 to 100° C. and preferably at about 55–60° C.

The starting materials of Formula III are prepared according to the following reaction scheme, the steps of which are exemplified below.

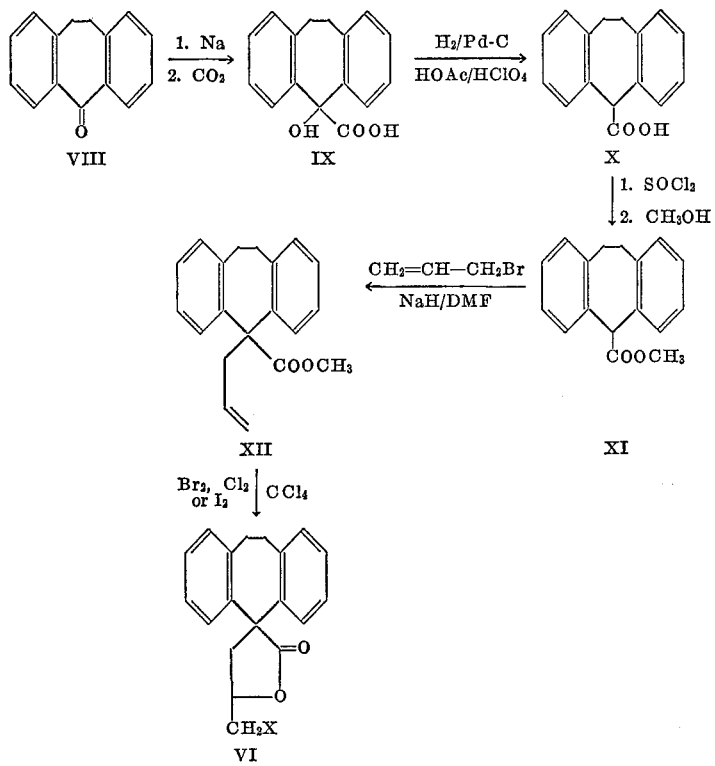

wherein X is as described above. The preparation of compound IX is described in Netherlands Patent No. 6,513,732.

The compounds of this invention where $R^2$ is hydrogen can also be prepared by the following reaction scheme

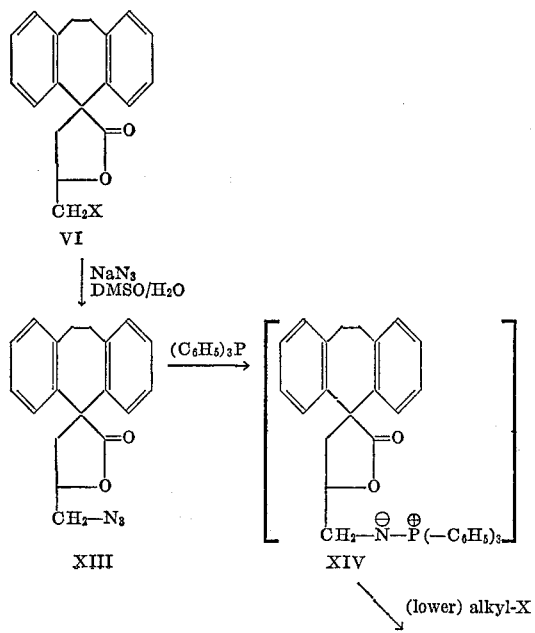

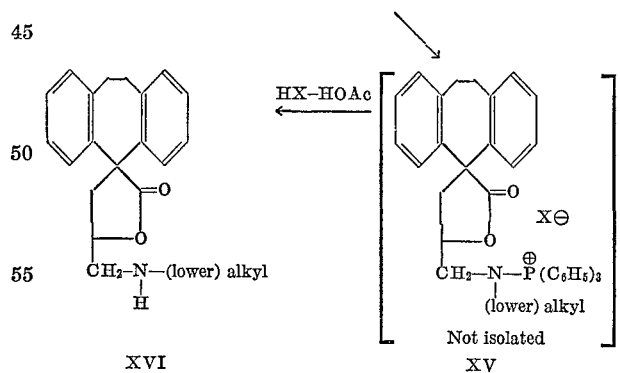

where X is as described above.

Spiro[dibenzo[a,d][1,4]cycloheptadiene - 5 - 2' - (4'-halomethyl)-butyrolactone] (VI) where halo is chloro, bromo, or iodo but preferably iodo (produced by reaction of compound XII with iodine in the presence of silver cyanate followed by treatment with concentrated hydrochloric acid) is reacted with an alkali metal azide e.g., sodium azide in a non-reactive solvent e.g., dimethylsulfoxide to produce spiro[dibenzo[a,d][1,4]cycloheptadiene-5-2'-(4'azidomethyl)-butyrolactone] (XIII). Preferably the reaction is carried out at a temperature of about 20–100° C. Compound XIII is reacted with triphenyl phosphine in the presence of a non-reactive solvent e.g., benzene the resulting product is reacted with a (lower)alkyl halide, preferably an iodide to produce compound XV, which is reacted with a mineral acid e.g., hydrochloric acid and hydrobromic acid in the presence of acetic acid to produce a spiro[dibenzo[a,d][1,4] cycloheptadriene - 5 - 2' - (4'-(lower)alkylaminomethyl)-butyrolactone] (XVI).

The compounds of this invention where $R^2$ is hydrogen are also prepared according to the following reaction scheme

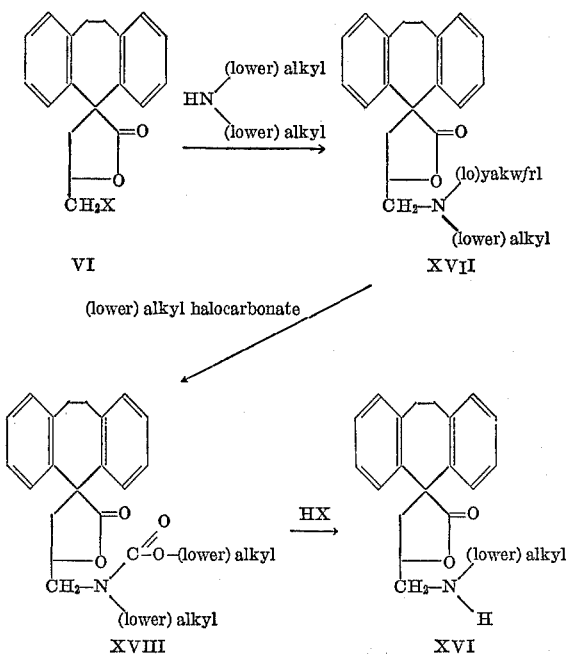

where X is as described above.

Spiro[dibenzo[a,d][1,4]cycloheptadiene - 5 - 2' - (4'-halomethyl)-butyrolactone] (VI) where halo is chloro, bromo or iodo is reacted wtih a di(lower)alkylamine to produce a spiro[dibenzo]a,d][1,4]cycloheptadiene-5-2'-(4'-di(lower)alkyl aminomethyl)-butyrolactone] (XVII) according to the procedure described above. Compound XVII is reacted wtih a (lower)alkyl halocarbonate e.g., ethyl chloroformate in a nonreactive solvent e.g., benzene at a temperature of about 10 to 100° C. to produce spiro-[dibenzo[a,d][1,4]cycloheptadiene - 5 - 2' - (4' - carb-(lower)alkoxy - N - (lower)alkylaminomethyl)-butyrolacetone] (XVIII). Compound XVIII is reacted with a mineral acid e.g., hydrochloric acid and hydrobromic acid preferably in the presence of acetic acid to produce spiro[dibenzo[a,d][1,4]cycloheptadiene - 5 - 2' - (4'-(lower)alkylaminomethyl)-butyrolactone (XVI). This reaction is conveniently carried out at a temperature of about 20 to 100° C.

Alternatively the compounds of this invention where $R^2$ is hydrogen are prepared by reaction of compound VI with a (lower)alkylbenzylamine followed by debenzylation e.g., according to the procedure described in J. Org. Chem. vol. 26, pp. 40–57 (1961) or by hydrogenation in the presence of a catalyst e.g., palladium.

The compounds of this invention contain an asymmetric carbon atom, and thus normally occur as a racemic mixture of the two optical isomers. The racemates are resolved into the optical isomers according to known resolution procedures, for example, by resolution with an optically active acid, e.g., mandelic acid by the procedure used on amines e.g., α-phenethylamine and amphetamine. The racemic mixtures and the individual optical isomers are within the scope of this invention.

The compounds of this invention are valuable pharmaceutical agents. They exert an antidepressant effect in mammals and are therefore useful as antidepressant agents.

The antidepressant effect of the compounds of this invention is demonstrated by their ability to prevent the sedative effects of reserpine in mice. Oral administration of as little as 2.5 mg./kg. of a preferred compound of the present invention, spiro[dibenzo[a,d] [1,4] cycloheptadiene-5-2'-(4'-methylaminomethyl) - butyrolactore] hydrobromide (IV) in mice three hours before intravenous administration of 5 mg./kg. of reserpine completely prevented symptoms usually associated with reserpine administration i.e., increased motor activity, profuse salivation and ptosis. Spiro[dibenzo[a,d] [1,4] cycloheptadiene - 5-2'-(4'-dimethylaminomethyl)-butyrolactone] hydrobromide (III) was active at 20 mg./kg. in the foregoing test. Thus these compounds exhibit marked antidepressant activity. The foregoing compounds have the following $LD_{50}$ (oral) in the mouse:

Compound: $LD_{50}$
III _____ 550
IV _____ 1200

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water ncluding sterile water. The compositions may take the form of tablets, powders, granules, capsules, suspensions, solutions, and the like.

The compounds of this invention when administered orally or parenterally in an antidepressant amount are effective in treating depression in mammals. A dosage range of about 1 to about 100 milligrams per kilogram per day is convenient which may be administered in divided dosage, e.g., two, three or four times a day. Administration of the compounds is conveniently begun at the minimal effective dose (MED) of the particular compound in the particular species of mammal. However, in general, the particular dosage most suitable for a particular application, as might be expected, will vary with the age, weight and general health of the mammal under treatment and the degree of antidepressant effect required. After taking into consideration these factors and any other factors to be considered, one skilled in the art of treating diseases of mammals can readily determine the appropriate dosage.

EXAMPLE 1

Preparation of Compound IX

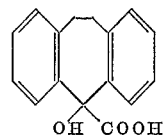

(Procedure described in Netherlands Patent No. 6,513,-732)

Dioxan (100 ml.) was distilled from lithium aluminum hydride directly into a 250 ml. 3-necked flask fitted with a mechanical stirrer (Note 1), a thermometer, and an inlet tube to allow the introduction of purified, dry nitrogen (Note 2). The apparatus was charged with 2.445 g. (106.3 mmoles) of sodium (Note 3) and the mixture was heated until the sodium melted (Note 4). At this point vigorous stirring was initiated; when the sodium had reached a state of fine dispersion, heating was discontinued, but the stirrer was not stopped until the mixture had reached room temperature. The mixture was cooled to about 15° C. and 10.41 g. (50 mmoles) of the ketone was added over a 5 minute period (Note 5). When the addition was completed, the mixture was stirred vigorously at room temperature for 2 hours. (The deep blue color of the radical anion developed very rapidly.) To the above mixture was cautiously added finely pulverized, solid carbon dioxide with vigorous stirring. The blue color fades very rapidly and the mixture becomes difficult to stir efficiently. It is important that a large excess of carbon dioxide be added. When enough carbon dioxide is present, sufficient tetrahydrofuran is added to allow good stirring, and then methanol is added cautiously to decompose the excess sodium (Note 6). When all of the sodium has been decomposed the mixture is diluted with a large volume of water, and the unreacted ketone was removed by extraction into dichloromethane. This extract was dried over sodium sulfate, the solvent was removed in vacuo and the residue was evaporatively distilled in vacuo (125/ 0.005 mm.) to give 3.98 g. of the starting ketone.

The basic aqueous phase from above was cautiously acidified with concentrated hydrochloric acid. After cooling in ice, the product was collected by filtration, washed well with ice water, and dried in vacuo. The yield of acid was 7.9 g. (100% based on starting material consumed), M.P. 210–215° C. d. (Note 7).

NOTES (1) A paddle stirrer was used.

(2) The apparatus was dried for several hours at 110–120° C.

(3) This and all subsequent operations must be performed in a nitrogen atmosphere.

(4) 90–100° C. It is simplest to heat the dioxan to gentle reflux.

(5) The reaction temperature should not exceed 25° C. during this operation.

(6) A solution of aqueous methanol (1:1) can be used, but extreme caution must be exercised. It is preferable that the reaction mixture be maintained in an ice bath under an atmosphere of nitrogen during this operation. Only when the decomposition of the sodium is complete can the nitrogen supply be shut off.

(7) The decomposition point depends on the rate of heating. The compound undergoes much prior darkening.

EXAMPLE 2

Preparation of Compound X

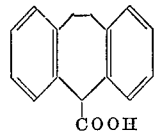

A suspension of compound IX (5.095 g., 20 mmoles) in 100 ml. of glacial acetic acid containing 4 ml. (Note 1) of 60% perchloric acid and 510 mg. of 10% palladium on charcoal was hydrogenated at room temperature and an initial pressure of 45 p.s.i.g. The theoretical amount of hydrogen is absorbed in 2–3 hours. The mixture (Note 2) was warmed until solution occurred and the hot mixture was filtered through Celite. The filter cake was washed with a little hot acetic acid and the combined filtrates were concentrated to a small volume in vacuo. The residue was quantitatively transferred to another vessel with a little acetic acid and a large excess of ice water was added. The crystalline solid was collected by filtration, washed well with ice cold water and dried in vacuo. The product weighed 3.970 g. and had M.P. 216–218° C. (83% yield).

NOTES (1) I.e., 2 ml./mmole. Less acid results in under reduction.

(2) A large amount of the acid crystallizes out of solution during the hydrogenation.

EXAMPLE 3

Preparation of Compound XI

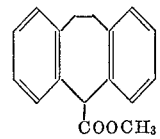

5.159 g. (21.7 mmoles) of compound X and 5.2 g. of thionyl chloride in 20 ml. of benzene was heated on a steam bath for 3 hours. The solution was cooled, the solvent and excess thionyl chloride was removed in vacuo and the residual oil was taken up in 50 ml. of anhydrous benzene to which had been added 5 ml. of methanol, and the solution was heated at reflux temperature for 18 hours. The cooled solution was shaken with sodium carbonate solution (100 g./l.), then with water, and finally it was dried over anhydrous sodium sulfate. The solvent was removed in vacuo and the residue was taken up in hot cyclohexane. This solution was diluted with an equal volume of petroleum ether and on cooling it (B.P. 35–60° C.) gave 4.185 g. of a solid with M.P. 92–93° C. The mother liquors were evaporated and the residue was crystallized as above to give an additional 0.131 g. of product M.P. 92–92.5° C. Yield 4.316 g. (79.8%). For analysis the ester was crystallized once more from the above solvent system. After drying in vacuo at room temperature over phosphorous pentoxide for 24 hours it had M.P. 93.5–95° C. Calcd. for $C_{17}H_{16}O_2$: C, 80.92; H, 6.39. Found: C, 81.91; H, 6.25.

EXAMPLE 4

Preparation of 5-allyl-5-carbomethoxydibenzo [a,d] [1,4] cycloheptadiene (XII)

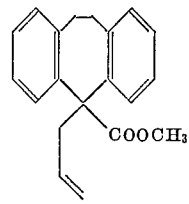

1.0 g. (25 mmoles of NaH) of 60% sodium hydride in oil dispersion was washed free of oil with 3×10 ml. of hexane. It was treated with 15 ml. of dry dimethylformamide and cooled to 0° C. A solution of compound XI (2.52 g., 10 mM.) and allyl bromide (3.03 g., 25 mM.) in 25 ml. of dry dimethylformamide was added dropwise with stirring under an atmosphere of dry nitrogen keeping the temperature below 10° C.

The mixture was then allowed to come to room temperature and was stirred for 3½ hours. Gas evolution became slow after 3 hours and the temperature did not exceed 29° C. at any time.

The mixture was then cooled and treated dropwise with methanol to decompose the excess hydride. It was then poured onto a large volume of cold water and extracted with benzene. The benzene phase was washed several times with water and then dried over anhydrous sodium sulphate. Evaporation of the solvent gave a viscous oil (3.01 g.) which by thin-layer chromatography on alumina in 1:1 benzene:cyclohexane appeared to be almost pure product.

This crude product was purified by evaporative distillation in an air-bath (B.P. 140–150° C./0.01 mm.) giving a pale yellow, very viscous oil (2.69 g., 92%). Calculated for $C_{20}H_{20}O_2$: C, 82.15%; H, 6.89%. Found: C, 81.83%; H. 6.67%.

EXAMPLE 5

Preparation of Compound VI, spiro[dibenzo[a,d][1,4]cycloheptadiene-5-2'-(4'-bromomethyl)butyrolactone]

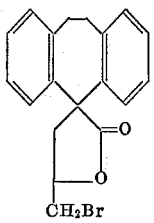

2.69 g. (9.2 mM.) of 5-allyl-5-carbomethoxydibenzo[a,d][1,4]cycloheptadiene (XII) was dissolved in 100 ml. of carbon tetrachloride and treated dropwise at room temperature with a solution of bromine (1.60 g., 10 mM.) in 10 ml. of carbon tetrachloride.

After stirring for 1½ hours only a pale yellow colour remained. The mixture was then washed once with water and once with dilute sodium carbonate solution (50 g./l.). It was dried over anhydrous sodium sulphate. Evaporation of the solvent gave a viscous oil (3.96 g.) and this crude product was used without further purification.

EXAMPLE 6

Preparation of spiro[dibenzo[a,d][1,4]cycloheptadiene-5-2' - (4' - dimethylaminomethyl) - butyrolactone] - hydrobromide

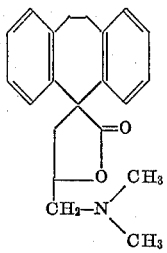

The crude compound (VI) (3.96 g., 9.2 mM. maximum) was dissolved in 100 ml. of 20% dimethylamine in dimethylformamide solution. The mixture was heated in a pressure bottle at 60–65° C. for 21 hours. It was then cooled, evaporated to one-half volume, and poured onto a large volume of cold water. The product was extracted into benzene (200 ml.) and the benzene phase washed with water and then extracted with dilute hydrochloric acid (2×100 ml.).

The acidic extracts were combined and made alkaline with sodium carbonate solution (200 g./l.). The liberated base was extracted with methylene chloride and dried over anhydrous sodium sulphate. Evaporation of the solvent gave 2.50 g. of the basic product.

It was dissolved in ether, filtered, and converted to the hydrobromide salt with gaseous hydrogen bromide. The crude salt was crystallized from isopropanol giving a first crop of 1.94 g. with M.P. 233–235° C. and a second crop of 0.27 g. with M.P. 230–234° C. Yield is 2.21 g. (60.5%) based on 5-allyl-5-carbomethoxydibenzo[a,d] [1,4] cycloheptadiene (XII).

Two more crystallizations from the same solvent raised the melting point to 235.5–236.5° C. It was dried in vacuo at 77° C. over phosphorous pentoxide for 7 hours before analysis.

Calculated for $C_{21}H_{23}NO_2 \cdot HBr$: C, 62.70%; H, 6.01%; N, 3.48%. Found: C, 62.75%; H, 6.10%; N, 3.33%.

EXAMPLE 7

Preparation of spiro[dibenzo[a,d][1,4]cycloheptadiene-5-2'-(4'-N-carbethoxy-N-methylaminomethyl) - butyrolactone]

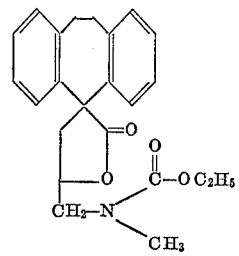

A solution of ethyl chloroformate (3.24 g., 30 mM.) in 25 ml. of dry benzene was treated dropwise under good stirring with a solution of spiro[dibenzo[a,d][1,4]cycloheptadiene-5-2'-(4'-dimethylaminomethyl) - butyrolactone][1] in dry benzene. A white solid began to form almost immediately and the mixture was stirred at room temperature for 18 hours.

The mixture was then heated at gentle reflux for 6½ hours. On cooling, it was washed with dilute hydrochloric acid, water, and saturated salt solution. It was dried over anhydrous sodium sulphate. Evaporation of the solvent gave 3.10 g. (83% crude) of the product which was used without further purification.

---

[1] 4.02 g. (10 mM.) of the hydrobromide salt was made alkaline with sodium carbonate solution and the free base was extracted into 50 ml. of benzene, which was dried over anhydrous sodium sulphate.

EXAMPLE 8

Preparation of spiro[dibenzo[a,d][1,4]cycloheptadiene-5-2'-(4'-methylaminomethyl)-butyrolactone]

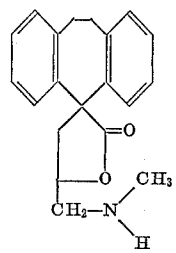

3.1 g. (8.2 mM.) of the product of Example 7 was dissolved in 50 ml. of glacial acetic acid and treated with 25 ml. of 48% hydrobromic acid. The mixture was heated under gentle reflux for 20 hours.

On cooling, the mixture was evaporated to a small volume and the residue poured onto cold water. It was made alkaline with sodium carbonate solution (200 g./l.) and the product was extracted into benzene. The benzene solution was then extracted with dilute hydrochloric acid (2×100 ml.).

The combined acid extracts were made alkaline with sodium carbonate solution (200 g./l.) and the basic material was extracted into methylene chloride. It was dried over anhydrous sodium sulphate. Evaporation of the solvent gave 2.0 g. of the basic product.

This base was dissolved in ether, filtered, and converted to the hydrochloride salt with gaseous hydrogen chloride. The crude salt was crystallized from isopropanol giving a first crop of 1.41 g. with M.P. 269–271° C. and a second crop of 0.40 g. with M.P. 267–270° C. Yield is 1.81 g. (72%).

Two more crystallizations from the same solvent gave the hydrochloride M.P. 269–270° C.

Calculated for $C_{20}H_{21}NO_2 \cdot HCl$: Cl, 10.31%. Found: Cl, 10.10%.

The hydrobromide salt was also prepared and crystallized from 2-propanol. This gave material with M.P. 244–

245.5° C. It was dried over phosphorous pentoxide at 77° C. in vacuo for 18 hours before analysis.

Calculated for $C_{20}H_{23}NO_2 \cdot HBr$: C, 61.87%; H, 5.71%; N, 3.61%. Found: C, 61.69%; H, 5.70%, N, 3.86%.

EXAMPLE 9

When in the procedure of Example 6 dimethylamine is replaced by an equal molar amount of ammonia, diethylamine, ethylamine, isopropylamine, propylamine, methylethylamine, butylamine, hexylamine, pentylamine, dibutylamine, octylamine, and dipropylamine, there are obtained:

spiro[dibenzo[a,d][1,4]cycloheptadiene-5-2'-(4'-aminomethyl)-butyrolactone]
spiro[dibenzo[a,d][1,4]cycloheptadiene-5-2'-(4'-diethylaminomethyl)-butyrolactone]
spiro[dibenzo[a,d][1,4]cycloheptadiene-5-2'-(4'-ethylaminomethyl)-butyrolactone]
spiro[dibenzo[a,d][1,4]cycloheptadiene-5-2'-(4'-isopropylaminomethyl)-butyrolactone]
spiro[dibenzo[a,d][1,4]cycloheptadiene-5-2'-(4'-propylaminomethyl)-butyrolactone]
spiro[dibenzo[a,d][1,4]cycloheptadiene-5-2'-(4'-methylethylaminomethyl)-butyrolactone]
spiro[dibenzo[a,d][1,4]cycloheptadiene-5-2'-(4'-butylaminomethyl)-butyrolactone]
spiro[dibenzo[a,d][1,4]cycloheptadiene-5-2'-(4'-hexylaminomethyl)-butyrolactone]
spiro[dibenzo[a,d][1,4]cycloheptadiene-5,2'-(4'-pentylaminomethyl)-butyrolactone]
spiro[dibenzo[a,d][1,4]cycloheptadiene-5-2'-(4'-dibutylaminomethyl)-butyrolactone]
spiro[dibenzo[a,d][1,4]cycloheptadiene-5-2'-(4'-octylaminomethyl)-butyrolactone] and
spiro[dibenzo[a,d][1,4]cycloheptadiene-5-2'-(4'-dipropylaminomethyl)-butyrolactone] respectively.

ALTERNATE PROCEDURE

EXAMPLE 10

Preparation of 5-allyl-5-carbomethoxydibenzo[a,d][1,4]cycloheptadiene (XII)

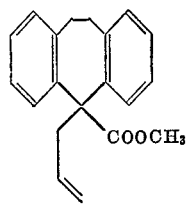

9.68 g. of 55% sodium hydride dispersion in mineral oil was washed free of carrier with 2×100 ml. of hexane and the last traces of hexane were removed in vacuo. To this solid was added 300 ml. of dry dimethylformamide and the stirred mixture was cooled to 0° in an ice-salt bath.

A solution of compound XI (55.2 g., 222 mmoles) and allyl bromide (41.0 g., 339 mmoles) in 300 ml. of dry DMF was added dropwise to the above stirred mixture at a rate such that the reaction temperature did not exceed 5° C. then allowed to reach room temperature spontaneously. After 18 hours the clear solution was poured into a large volume of ice water and the product was extracted into benzene. The benzene phase was washed several times with water and then dried over sodium sulfate. Evaporation of the solvent in vacuo gave 62.9 g. of a thick oil. This material was exceedingly difficult to purify. Very careful chromatography (alumina) indicated that it was a 1:1 mixture of the α-allylated methyl ester and the starting material.

EXAMPLE 11

Preparation of spiro[dibenzo[a,d][1,4]cycloheptadiene-5-2'-(4'-iodomethyl)-butyrolactone]

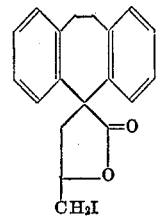

The mixture obtained in Example 10 (62.9 g., 215 mmoles assuming 100% α-allyl methyl ester) was dissolved in 500 ml. of dry ether and slurried with 43.0 g. (287 mmoles) of silver cyanate. The stirred mixture was cooled to 0° C. and 54.5 g. (215 mmoles) of iodine was added all at once. After 3.5 hours at 0° C. the mixture was filtered through Celite. The filter cake was washed with a large amount of dichloromethane. The combined filtrates were evaporated to a small volume in vacuo after washing with dilute bisulfite solution, water, and drying over sodium sulfate. The above viscous oil was taken up in ca 1200 ml. of methanol, 300 ml. of concentrated hydrochloric acid was added and the resultant was stirred at room temperature for 2–3 hours. The crystalline solid which separated was collected by filtration; it weighed 23.9 g. and had M.P. 139–141° C. The mother liquor was concentrated in vacuo, dissolved in the minimum amount of methanol, and the insoluble solid (2.51 g.) was collected by filtration. The filtrate was once again concentrated in vacuo and the viscous oil remaining was set aside. After two weeks this oil had partially crystallized. Workup as above gave an additional 8.07 g. of the product with M.P. 140–142° C. After a further two weeks an additional 2.33 g. of product could be collected. The total yield of product up to this point was 36.81 g. (44.6%). The residual oil contained considerable amounts of non-alkylated material as evidenced by the recovery of substantial portions of dibenzocycloheptadiene-5-carboxylic acid on hydrogen bromide promoted hydrolysis.

For analysis the iodo lactone was recrystallized from methanol. On subsequent crystallizations the observed melting points were 141–142, 142–143 and 142–143° C. It was dried in vacuo over phosphorous pentoxide at 77° C. for 18 hours. Calcd. for $C_{19}H_{17}IO_2$: C, 56.44; H, 4.24. Found: C, 56.50; H, 4.14.

EXAMPLE 12

Preparation of spiro[dibenzo[a,d][1,4]cycloheptadiene-5-2'-(4'-azidomethyl)-butyrolactone]

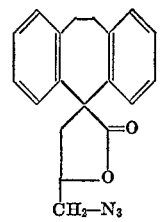

2.02 g. of the iodo lactone of Example 11 (5.0 mmoles) in 60 ml. of dimethylsulfoxide was mixed with a solution of 3.25 g. (50 mmoles) sodium azide in 15 ml. of water. The solution thus obtained was heated on a steam bath for 47 hours, after which time it was poured into a large volume of water. The azide was extracted into benzene, the benzene solution was back extracted with water to remove dimethyl sulfoxide, and then dried over anhydrous sodium sulfate. Evaporation of the solvent in vacuo gave 1.59 g. of a viscous oil which had a strong infrared absorption at 2110 cm.$^{-1}$ (liquid film). The azide was used without further purification.

EXAMPLE 13

Preparation of spiro[dibenzo [a,d][1,4] cycloheptadiene-5-2'-(4'-methylaminomethyl)-butyrolactone]

The crude azide from Example 12 (1.59 g., 4.98 mmoles) and triphenyl phosphine (1.32 g., 5.04 mmoles) were dissolved in 50 ml. of anhydrous benzene and the solution was heated at reflux for 2 hours. To the cooled solution was added 1.06 g. (7.47 mmoles) of methyl iodide and reflux was resumed and continued for 2 hours. The cooled mixture was concentrated in vacuo and to the viscous residue was added 25 ml. of glacial acetic acid and 25 ml. of 48% hydrobromic acid. Reflux conditions were once again initiated and maintained for 4 hours. The solution was diluted with a large volume of water and extracted with dichloromethane to remove triphenyl phosphine oxide. The colorless acidic phase was made alkaline with saturated sodium carbonate solution and the liberated base was extracted into dichloromethane. The extract was dried over sodium sulfate, and evaporated in vacuo leaving 1.07 g. of an oil whose infrared spectrum (liquid film) had a broad medium absorption centered at 3370 cm.$^{-1}$ and a sharp intense band at 1770 cm.$^{-1}$. The free base is rather unstable and consequently it should be converted to one of its stable salts without delay.

The above oil was converted to its hydrobromide in ether, and the solid thus obtained was crystallized from 2-propanol. The first crop of beautifully crystalline product weighed 655 mg. and had M.P. 238–240° C. A second less pure crop was obtained by evaporation of the mother liquors and crystallization of the residue (310 mg., M.P. 205–225° C.). This second crop on recrystallization gives material of the same purity as the first crop.

For analysis the salt was recrystallized from 2-propanol. On subsequent crystallizations the melting points were 242–244, 243–245, 244–245.5 and 244–245.5° C. It was dried over phosphorous pentoxide at 77° C. in vacuo for 18 hours before analysis. Calcd. for $C_{20}H_{21}NO_2 \cdot HBr$: C, 61.87; H, 5.71; N, 3.61. Found: C, 61.69; H, 5.70; N, 3.86.

The hydrochloride, made in the usual manner in ether, had M.P. 261–263° C. on crystallization from 2 propanol. Recrystallization from the same solvent gave material with M.P. 262–263° C. Calcd. for $C_{20}H_{21}NO_2 \cdot HCl$; C, 10.31. Found: C, 10.10.

EXAMPLE 14

Preparation of spiro [dibenzo [a,d][1,4] cycloheptadiene-5-2'-(4'-dimethylaminomethyl)-butyrolactone]

8.08 g. (20 mmoles) of the iodo lactone from Example 11 was dissolved in 110 ml. of 10 wt. percent dimethylamine in benzene. This was stirred with 2.76 g. (20 mmoles) of potassium carbonate at 65° C. for 48 hours (pressure bottle). The cooled mixture was filtered and evaporated in vacuo. The residue was slurried with water and the liberated base was extracted into benzene. The benzene phase was shaken with 10% hydrochloric acid, washed with water, dried over sodium sulfate and then evaporated in vacuo, to give 0.892 g. of recovered iodo lactone.

The acid phase from above was made basic with saturated sodium carbonate solution and the liberated base was extracted into benzene. The extract was dried over sodium sulfate and evaporated in vacuo to give 5.55 g. (97% based on iodo lactone consumed) of an oil which could be converted in ether to a hydrobromide in greater than 90% yield. It crystallized readily from 2-propanol to give a white solid with M.P. 233–235° C. Two more crystallizations from the same solvent raised the melting point to 235.5–236.5° C. It was dried in vacuo at 77° C. over phosphorous pentoxide for 7 hours before analysis. Calcd. for $C_{21}H_{23}NO_2 \cdot HBr$: C, 62.70; H, 6.01; N, 3.48. Found: C, 62.75; H, 6.10; N, 3.33.

We claim:
1. A compound selected from the group consisting of compounds of the formula

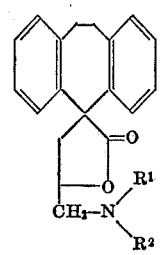

wherein $R^1$ and $R^2$ are each a member selected from the group consisting of hydrogen and (lower)alkyl having up to 8 carbon atoms; and the pharmaceutically acceptable nontoxic salts thereof.

2. A compound of claim 1 having the formula

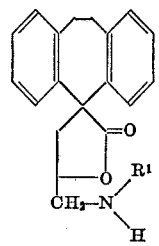

wherein $R^1$ is (lower)alkyl having up to 8 carbon atoms.

3. The compound of claim 1 having the formula

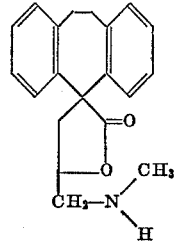

4. A pharmaceutically acceptable nontoxic salt of the compound of claim 3.

5. The compound of claim 1 having the formula

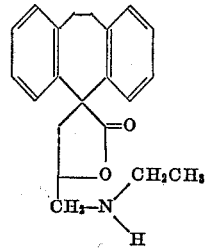

6. The compound of claim 1 having the formula

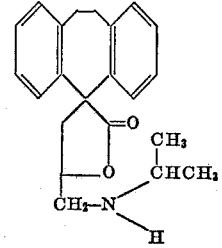

7. The compound of claim 1 having the formula
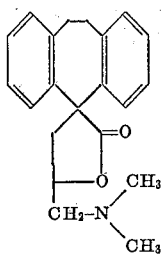
8. The compound of claim 1 having the formula
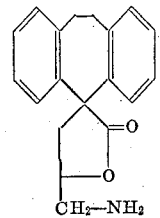
References Cited
UNITED STATES PATENTS
3,355,463   11/1967   Schmitt _____ 260—343.6
ALEX MAZEL, Primary Examiner
ANNE MARIE T. TIGHE, Assistant Examiner
U.S. Cl. X.R.
260—520, 515, 469; 424—279